United States Patent

[11] 3,634,620

[72] Inventor Jack Rudolph Harford
Flemington, N.J.
[21] Appl. No. 39,018
[22] Filed May 20, 1970
[45] Patented Jan. 11, 1972
[73] Assignee RCA Corporation
Continuation-in-part of application Ser. No. 803,590, Mar. 3, 1969, now abandoned. This application May 20, 1970, Ser. No. 39,018

[54] NOISE PROTECTED A.G.C. CIRCUIT WITH AMPLITUDE CONTROL OF FLYBACK PULSES
26 Claims, 4 Drawing Figs.

Figure 1:
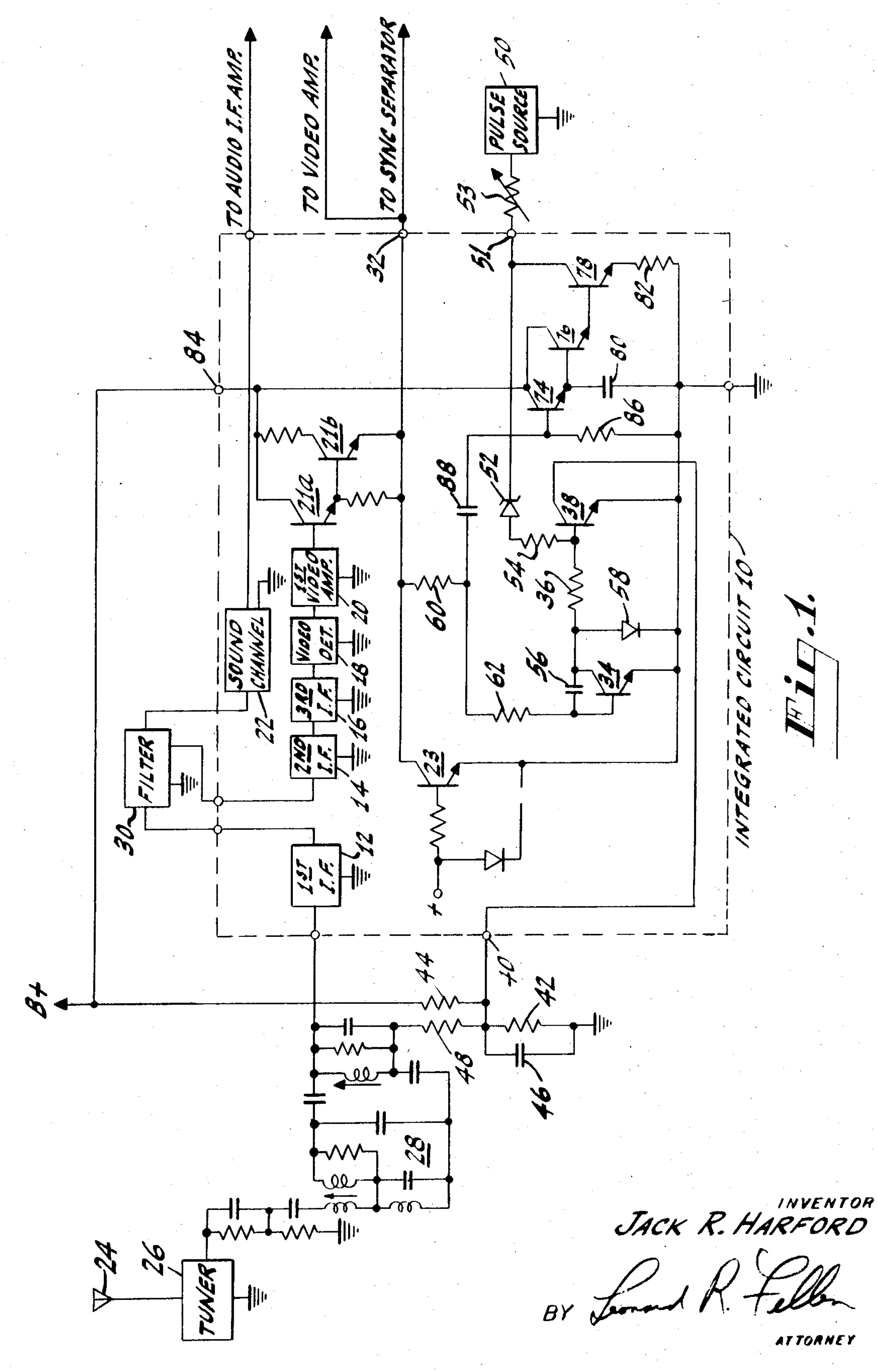

[52] U.S. Cl. .......... 178/7.3 DC, 178/7.5 DC, 178/DIG. 12
[51] Int. Cl. .......... H04n 5/52
[50] Field of Search .......... 178/7.3 R, 7.5 R, 7.3 DC, 7.5 DC, DIG. 12; 325/400, 404, 408

[56] References Cited

UNITED STATES PATENTS 3,236,946 2/1966 Hansen et al. .......... 178/DIG. 12

*Primary Examiner*—Robert L. Griffin
*Assistant Examiner*—George E. Stallar
*Attorney*—Eugene M. Whitacre ABSTRACT: A source of keying pulses which occur in time coincidence with the synchronizing pulse components of a video wave is coupled to the input circuit of an automatic gain control (AGC) transistor. The keying pulses are of a polarity to drive the AGC transistor into conduction to adjust the charge on a capacitor in AGC circuits connected in an output circuit of the transistor. Second and third transistors are connected across the input circuit to control the amplitude of the keying pulses applied to the AGC transistor. The normally conducting second transistor is driven by the video wave, and is responsive to the synchronizing pulse components above a predetermined amplitude, to cut off the second transistor and thereby permit keying pulses to develop across the input circuit and drive the AGC transistor into conduction. The third transistor conducts in response to impulse noise to attenuate the keying pulse, and thus substantially decrease the AGC system gain when impulse noise is present. Additional direct current sources are coupled to the AGC transistor under control of the second transistor to (1) prevent AGC lockout upon occurrence of sudden increases in received signal level under transient conditions and (2) speed the response of the AGC system under nonsynchronized, strong signal conditions.

INVENTOR
JACK R. HARFORD

BY Leonard R. Fellen

ATTORNEY

INVENTOR
JACK R. HARFORD
BY Kenneth R. Schaefer
Attorney

INVENTOR
JACK R. HARFORD
BY Leonard R. Fellen
ATTORNEY

NOISE PROTECTED AGC CIRCUIT WITH AMPLITUDE CONTROL OF FLYBACK PULSES

This is a continuation-in-part of my application Ser. No. 803,590 filed Mar. 3, 1969 now abandoned.

This invention relates to automatic gain control (AGC) circuits, and more particularly, to impulse noise protected AGC circuits for television receivers. AGC circuits embodying the invention are particularly suitable for fabrication using integrated circuit techniques.

As used herein, the term integrated circuit refers to a unitary or monolithic semiconductor device or chip which is the equivalent of a network of interconnected active and passive circuit elements.

AGC circuits are commonly used in television receivers to derive a suitable control voltage for application to the radio frequency (RF) and intermediate frequency (IF) amplifier stages of the receiver. The control voltage is effective to vary the gain of said stages inversely in accordance with the level of the synchronizing pulse components of a detected video signal so as to provide a constant amplitude detected video output signal. The synchronizing pulse components of the video signal are thereafter separated and used for synchronizing the horizontal and vertical oscillators associated with the respective horizontal and vertical sweep circuits of the receiver.

Noise pulses having amplitudes greater than the amplitude of the synchronizing pulses often become superimposed on the received composite television signal and may cause the generation of an incorrect automatic gain control voltage for the receiver and thus cause improper amplification of the received signal. Additionally, noise in the received television signal may tend to upset the synchronization of either the horizontal or vertical sweep circuits of the receiver with resulting picture deterioration.

While various AGC circuits having impulse noise protection or immunity are known, their application for fabrication in integrated circuits have heretofore been impractical due to several of the limitations involved in the utilization of integrated circuits—namely, the difficulty in fabricating the relative large valued capacitors required and/or the relative scarcity, due to economic and packaging design considerations, of available terminals on an integrated circuit for connection thereto of discrete large valued capacitors.

It is therefore an object of this invention to provide an improved automatic gain control circuit suitable for fabrication on an integrated circuit.

It is a further object of this invention to provide an automatic gain control circuit which includes means for reducing the deleterious effects on such circuits of impulse noise which may be present in a received television signal.

In accordance with the present invention, a source of keying pulses which occur in time coincidence with the synchronizing pulse components of a video wave are applied to the input circuit of an AGC transistor. Switch means responsive to the synchronizing signal components of the video wave is coupled across the input circuit to control the amplitude of keying pulses applied to the AGC transistor.

In accordance with another aspect of the invention, an AGC generating circuit is responsive to the synchronizing pulse components of a video wave, keying pulses, and undesirable impulse noise accompanying the video wave. Means which is responsive to the impulse noise is coupled to the keying pulse source to control the amplitude of the keying pulses applied to the AGC generating circuit.

In accordance with a further aspect of the present invention, means are coupled to the AGC transistor, under control of the switch means, for supplying additional currents thereto to prevent AGC lockout upon the occurrence of sudden increases in received signal level and to speed the response of the AGC system under nonsynchronized, strong signal conditions.

Figure 3:
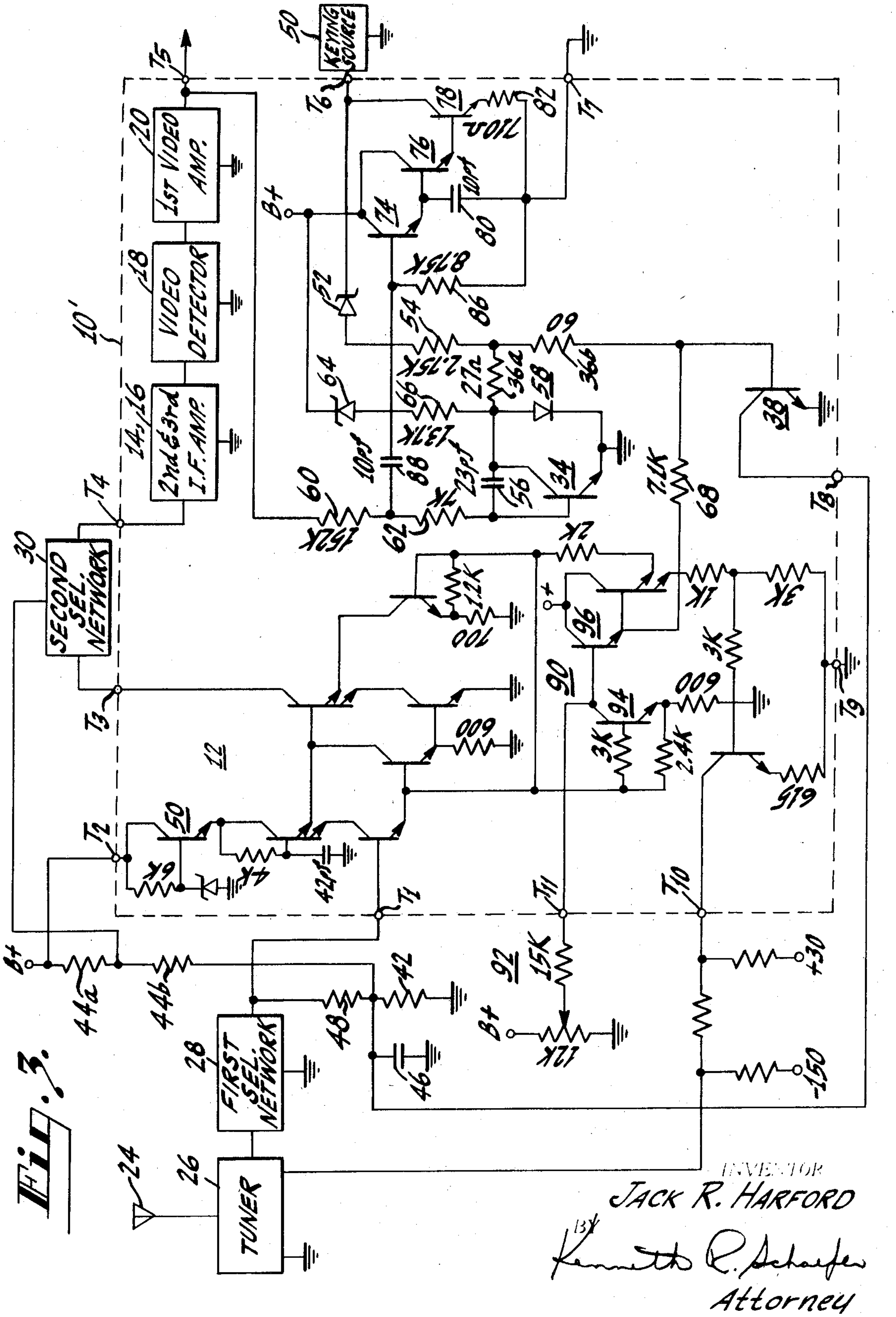
Figure 2A:
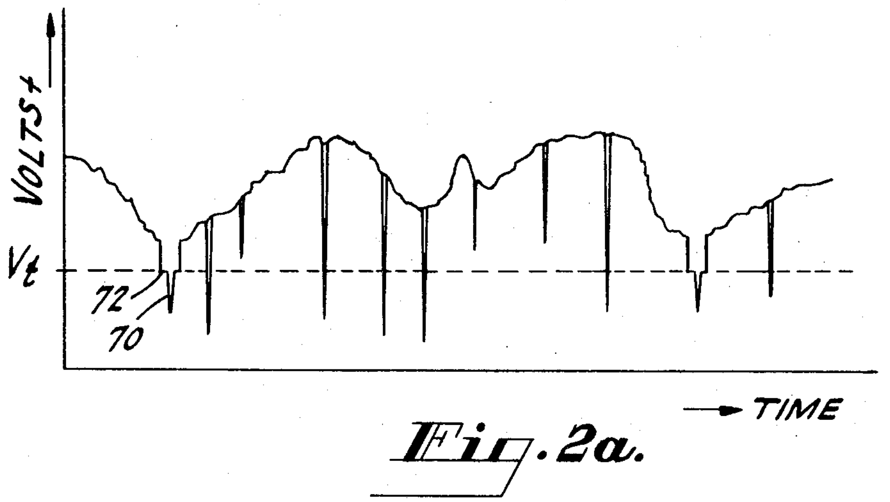
Figure 2B:
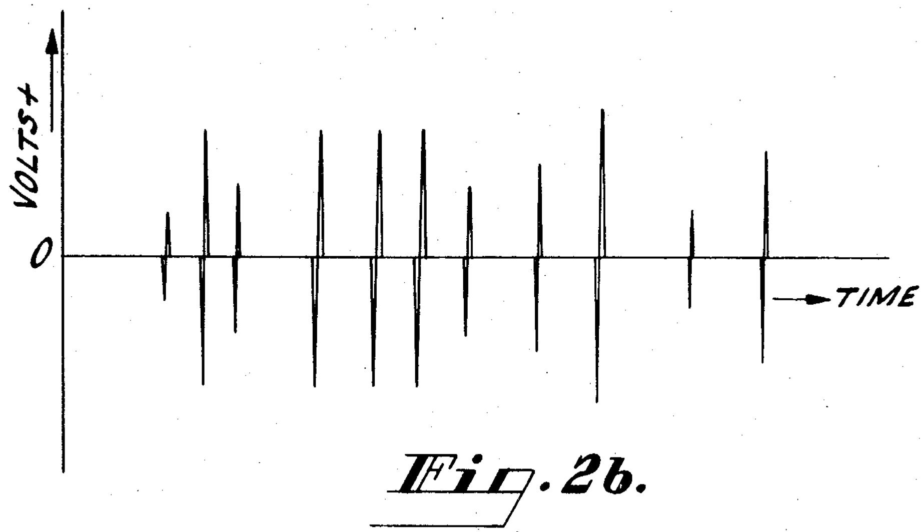

The novel features which are considered characteristic of the present invention are set forth with particularity in the appended claims. The invention, however, both as to its organization and method of operation, as well as additional objects thereof, will best be understood from the following description when read in connection with the accompanying drawing wherein:

FIG. 1 is a schematic circuit diagram partially in block form of a portion of a television receiver embodying the AGC circuit of the present invention;

FIGS. 2*a* and 2*b* are potential waveform diagrams useful in illustrating the operation of the present invention; and FIG. 3 is a schematic circuit diagram partially in block form of a portion of a television receiver embodying a modified version of the AGC circuit of the present invention.

Referring now to FIG. 1 of the drawing, the dashed rectangle 10 schematically represents a monolithic semiconductor integrated circuit chip. The chip has a plurality of contact areas or terminals about its periphery through which external connections to the various circuits on the chip can be made. In this regard and compatible with present day technology and design philosophy, there may be included on the chip 10 in a video signal processing channel which includes a first intermediate frequency amplifier 12, second and third intermediate frequency amplifiers 14 and 16, a video detector 18, a first video amplifier 20 and a sound channel 22 which may include an intercarrier sound detector and intermediate frequency amplifier.

In a television receiver employing the chip 10, a modulated carrier wave television signal is intercepted by an antenna 24 and coupled to a tuner 26. The tuner 26 may include, as is known, a radio frequency (RF) amplifier and a frequency converter for converting the received radio frequency signal to an intermediate frequency signal. The intermediate frequency signal derived from the tuner 26 is coupled by means of first frequency selective filter network 28 to the first intermediate frequency (IF) amplifier 12 located on the chip 10. Amplified intermediate frequency signals are coupled by means of a second frequency selective filter network 30 external to the chip 10 to second and third directly coupled IF amplifiers 14 and 16. A second output terminal of the second frequency selective filter network 30 is coupled to the sound channel 22, the output of which is a 4.5 MHz. carrier wave frequency modulated by the accompanying television sound information.

The amplifier intermediate frequency output of the third IF amplifier 16 is applied to a video detector stage 18 which is operative to recover the video signal information from the intermediate frequency signal. The signal output of the detector 18 is amplified in a first video amplifier 20 and is then coupled by way of a pair of emitter follower transistors **21*a* and 21*b* to the video output chip terminal 32 to other amplifiers (not shown) and external of the chip 10 for further amplification of the video signal prior to its being applied to the appropriate control electrodes of a cathode-ray tube for display. The video amplifier 20 also supplies signals for the sync separator circuits of the receiver (not shown) and located external to the chip 10**.

Referring now with particularity to the schematic portion of the drawing, a keyed AGC circuit is shown therein as part of the integrated circuit chip 10. The circuit includes a first transistor 34 having its emitter electrode connected to a point of reference potential or ground and its collector connected via a resistor 36 to the base electrode of a second transistor 38 also having its emitter electrode grounded. The collector electrode of the second transistor 38 is connected via a terminal 40 on the chip to the junction of external resistors 42 and 44 which are connected between a source of B+ operating potential and ground. A capacitor 46 is shunted across resistor 42 for the purpose of maintaining a derived AGC control voltage as will be hereinafter detailed. Connection is also made from the junction of resistors 42 and 44 via a third resistor 48 to the first frequency selective filter network 28 for the application of a derived AGC voltage to the input terminal of the first IF amplifier 12 on the chip so as to control the gain thereof. An example of an IF amplifier suitable for fabrication on an integrated circuit and receptive to an AGC voltage is shown and described in the copending application of Jack R. Harford, entitled "WIDE-BAND AMPLIFIER," Ser. No. 766,905 and filed Oct. 11, 1968 now abandoned in favor of a continuation Ser. No. 41,755.

Operating potential for the transistor 34 and a base current drive for the second transistor 38 is supplied from a source 50 in the form of recurrent voltage pulses coincident with the synchronizing components of the received video signal. Connection to the source 50 is made via terminal 51 on the chip 10 through an adjustable external source resistor 53. The source 50 includes means for deriving recurrent flyback voltage pulses from an output transformer associated with the receiver horizontal deflection circuit. The voltage pulses are coupled from the chip terminal 51 through a Zener diode 52 in series with a current limiting resistor 54 to the junction of the resistor 36 and the base electrode of transistor 38. The Zener diode 52 serves to offset the base level of the recurrent voltage pulses slightly above ground and above the level of any AC ripple voltage components that may accompany the voltage pulses, in order to prevent false keying of the transistor 34. A small capacitor 56 of the order of 10 picofarads (pf.) is connected between the base and collector electrodes of the transistor 34 for reducing its bandwidth response. Connected for forward conduction across the collector-emitter electrodes of the transistor 34 is a diode 58, which may be formed on the chip 10 by a transistor having its collector and base electrodes directly connected together.

A detected video signal having negative going sync tip excursions is coupled from the video amplifier 20 via emitter followers 21*a* and 21*b* through a decoupling resistor 60 in series with a current-limiting resistor 62 to the base electrode of the transistor 34.

When the output of the video amplifier 20 exceeds a predetermined level, the AGC circuit operates to decrease the gain of the IF amplifiers and/or RF amplifiers in the tuner 26 to maintain a substantially constant video output signal level. Conversely, when the video amplifier output signal falls below said predetermined level, the AGC circuit operates to increase the gain of the signal amplifiers within the limits of their maximum capabilities.

The AGC transistors 34 and 38 operate as follows. The quiescent voltage at the base electrode of transistor 34 is held at a positive potential determined by a DC voltage coupled from the first video amplifier 20 through transistors 21*a* and 21*b* and resistors 60 and 62 to the base electrode of the transistor 34. Thus, in the absence of signal, the transistor 34 is biased to a highly conductive condition so as to exhibit a low collector impedance. The keying pulses from the source 50 are thus clamped to ground by the transistor 34. When the level of the received signal rises above a predetermined threshold, the synchronizing pulse components (sync tips) will extend far enough in the negative direction to cut off the transistor 34 during the occurrence of the recurring voltage pulses from the source 50. The transistor 34 will thus be seen to operate as a keyed switch providing a relatively low-impedance shunt path across the diode 58 during weak signal conditions, and an open circuit or high impedance path with respect to its effect in shunt circuit across the diode 58 during periods when strong signals are received.

Noting that the anode-cathode junction of the diode 58 is fabricated on the chip 10 from the same conductivity materials, has the same geometry and is in the same thermal environment as the base-emitter junctions of the transistors 34 and 38, the conduction threshold potentials of the diode anode-cathode junction and the base-emitter junctions of the transistors 34 and 38 are all substantially equal. For maximum gain conditions, wherein the sync tip voltage is insufficient to cut off the transistor 34, the recurring voltage pulses from source 50 will be clamped to about 0.2 volts above ground by the collector-to-emitter path of transistor 34. The 0.2 volts DC voltage is also developed across the diode 58. The value of the resistor 36 is chosen such that with the transistor 34 biased full-on, the voltage drop across the diode 58 together with the voltage developed across the resistor 36 coupled to the base-emitter junction of the second transistor 38 will be less than its threshold potential ($\approx$0.6 volts DC) and therefore insufficient to turn it on. For these conditions, the collector voltage of the transistor 38 will stay at its maximum operating potential as determined by the divider network resistors 44 and 42, and the AGC output capacitor 46 will proceed to charge to this level. An increase in the amplitude level of the video signal or the presence of impulse noise will drive the base electrode of the first transistor 34 sufficiently negative to increase the collector-to-emitter impedance thereof. For these conditions, current from the keying voltage source 50 will be shunted through the diode 58 and the voltage developed thereacross will rise to the contact potential of the diode. With a suitable choice in value for the resistor 36, the voltage developed thereacross together with the voltage drop across the diode (approximately 0.6 volts DC for silicon) will be sufficient to bias the transistor 38 into conduction, thereby causing a decrease in its collector output voltage and subsequent decrease in the charge voltage on the AGC output capacitor 46. Thus, the base current injection to the transistor 38 can be preset to provide a desired amount of collector current flow through the transistor 38 during conduction thereof. The more negative AGC voltage developed across the capacitor 46 is fed via the resistor 48 through the coupling network 28 to the appropriate input terminal(s) of the IF amplifier 12 so as to be effective to bring about a gain reduction of the IF amplifier output.

Since the capacitor 46 will normally be charging to the collector-operating potential of the transistor 38 both during keyed cut off thereof and during the time intervals between keying, the ratio of collector current flow through the transistor 38 during conduction and discharging of the capacitor 46 to the capacitor charge current through the resistor 44 is preferably adjusted to be in the order 100:1. This ratio of currents has been found suitable for maintaining the average level of the AGC voltage developed across the capacitor 46 during intervals between keying, proportional to the strength of the detected video signal output from the amplifier 20 as referenced by the amplitude of the sync tip excursions of the video signal during keyed operation of the AGC circuit.

It will be apparent from the foregoing, that if impulse noise 70 accompanying the detected video signal output of the amplifier 20 overshoots the level $V_t$ of the sync tips 72, as illustrated in the waveform diagram of a detected video signal in FIG. 2*a*, and this overshoot occurs during a time interval coincident with keying of the AGC transistor 34, an incorrect AGC setup voltage may be developed across the output capacitor 46. This may cause improper amplification of the received signal which in turn may affect the receiver's sync separator circuits resulting in a possible loss of vertical and/or horizontal sync.

The horizontal sync pulse is about 5 microseconds in duration, and the keying pulse is about 15 microseconds in duration. A noise pulse occurring during the keying pulse interval will cause the transistor 38 to conduct more current than is desirable, and hence effect an undesirable change in the AGC output voltage developed across the capacitor 46.

In accordance with the present invention and referring again to FIG. 1, a circuit suitable for fabrication using integrated circuit techniques and which complements the above-described AGC transistor circuit by providing impulse noise protection against a false AGC setup voltage on the capacitor 46 includes three transistors 74, 76 and 78 in cascade arrangement. Transistors 74 and 76 are connected as emitter followers with the emitter electrode of the transistor 74 being directly connected to the base of the transistor 76 through a capacitor 80. Capacitor 80 is of the order of 10 pf. and as such is easily fabricated on the chip 10. The emitter electrode of the transistor 76 is directly connected to the base of the transistor 78 which has its emitter electrode returned to ground through a resistor 82. The collector electrode of the transistors 74 and 76 are commonly connected via the chip terminal 84 to the source of operating potential B+. Connection from the collector electrode of the transistor 78 is made via the chip terminal 51 to the recurrent voltage pulse source 50. The base electrode of the transistor 74 is returned to ground through a resistor 86. Connection is also made from the base electrode of the transistor 74 to the junction of resistors 60 and 62 via a capacitor 88. Resistor 86 and capacitor 88 form a high pass filter for differentiating noise impulses which may accompany the video signal output of the amplifier 20 to the base input electrode of the transistor 74. Operation of the circuit is as follows.

Noting that impulse noise generally has a greater high-frequency content and higher energy level than that of a normal video signal, the high-pass filter is designed, using a relatively small capacitor 88 (approximately 10 pf. and therefore easily fabricated on an integrated circuit chip), to sense impulse noise such that the leading and trailing edges of the noise pulses will pass through the capacitor 88 and be developed across the resistor 86, thereby to be coupled to the base electrode of the transistor 74. A waveform diagram illustrating the noise pulse output of the high pass filter is shown in FIG. 2*b*.

In the absence of impulse noise, the transistor 74 is normally biased off. The relatively large amplitude excursion of the trailing edge of the noise pulses coupled to the base electrode of the transistor 74 turns the transistor on to peak detect the positive going trailing edges of the differentiated noise pulses and develop a voltage across the emitter-connected capacitor 80. The load impedance for the transistor 74 is the base-emitter impedance of the transistor 76 in series with the base-emitter impedance of the transistor 78 and resistor 82.

The time constants of the circuit are such that a detected noise impulse, typically about 1 microsecond in duration is stretched about 5 microseconds. As a result, noise impulses occurring just before the keying pulse in a addition to noise impulses occurring during the keying pulses are detected and cause current to flow through the base-emitter path of transistor 78. This lowers the collector impedance of transistor 78, which in turn reduces the amplitude or level of the keying voltage coupled to the AGC transistors 34 and 38. The extent of conduction of the transistor 78 and therefore the amount by which the level of the keying voltage from the source 50 will be reduced will be dependent on the charge voltage on the capacitor 80 which in turn is dependent on the amplitude and quantity of the peak-detected noise pulses.

To see the effect of the preceding circuit on the operation of the AGC circuit, assume the presence of impulse noise in the video signal wherein the noise pulses are of a polarity such that they extend below the level $V_t$ of the video signal sync tip components and occur during the sync tip intervals as shown, for example, in FIG. 2*a*. As was heretofore described, the sync tip excursion below the level $V_t$ (due to the addition of the impulse noise) will bias the keyed AGC transistor 34 into cutoff. For this condition, the fraction or portion of the keying voltage developed across the diode 58 and resistor 36 will be of a magnitude sufficient to bias the transistor 38 into conduction to bring about a predetermined collector current flow through the transistor 38 to discharge the capacitor 46. This in turn would normally result in the development of an AGC voltage across the output capacitor 46 which tends to reduce the gain of IF amplifier 12 more than desired. However, the noise impulses present in the video signal will also be applied via the high-pass filter to the base input of the peak detector transistor 74. The application of noise pulses to the base of the transistor 74 will reduce the collector impedance of transistor 78, thereby bringing about a reduction in the amplitude level of the keying voltage.

The extent of conduction of the transistor 38 is a function of the magnitude of the bias voltage coupled across its base-emitter junction which in turn is the predetermined fraction of the keying voltage development across the resistor 36 and diode 58. It will be seen that this reduced level in the keying voltage due to conduction of the transistor 78 will decrease the magnitude of the voltage developed across the resistor 36 and diode 58 and thereby tend to counteract the increase in the voltage normally developed across the resistor 36 and diode 58 due to cutoff of the keyed switching transistor 34. The adjustable resistor 53 in series with the keying source 50 provides a convenient means for externally adjusting the amplitude level of the keying voltage at the collector electrode of the transistor 78, so that in the presence of impulse noise, the fraction of the reduced keying voltage developed across the diode 58 and resistor 36 will be insufficient to bias the transistor 38 into conduction, thereby preventing discharge of the capacitor 46 due to a false triggering or cut off biasing of the AGC transistor 34.

It will be noted that the circuit herein described is also operable in a nonkeyed mode to provide an automatic gain control voltage when a constant DC voltage source is utilized in place of the pulse source 50.

Referring to FIG. 3 of the drawing, a modified version of an AGC circuit in accordance with the present invention is shown. The AGC circuit is illustrated in connection with an I.F. amplifier arrangement such as is shown in my U.S. Pat. application Ser. No. 38,842 filed May 19, 1970 entitled "GAIN CONTROLLED AMPLIFIER."

Circuit elements which are common to FIGS. 1 and 3 are designated by the same reference numeral in each FIG. Furthermore, portions of the circuit shown in detail have been shown in block form in FIG. 3.

In FIG. 3, the integrated circuit chip is designated by the reference numeral 10' in view of the difference between it and chip 10 of FIG. 1. Terminals on chip 10' are designated as T1 to T11. The keyed AGC circuit coupled to the output of first video amplifier 20 is similar to that shown in FIG. 2 with the following exceptions. Two direct current supply paths are coupled, under control of transistor 34, to the input (base) of transistor 38. The first direct current source comprises the series combination of a zener diode 64 and a relatively large resistor 66 coupled between a potential source (B+) and the collector electrode of transistor 34. The collector of transistor 34 is coupled to the base of transistor 38 by means of the series combination of resistors 36*a* and 36*b*. The junction of resistors 36*a* and 36*b* is connected to the keying source 50 via resistor 54 and zener diode 52 described above in connection with FIG. 1.

The second direct current source is made available only under strong signal conditions as will appear below. To this end, the second current source is derived from an AGC delay control circuit 90 associated with I.F. amplifier 12 and tuner 26. The delay circuit 90 is described in detail in my above-referenced application Ser. No. 38,842 and will not be described here in detail. For purposes of the present invention, it is sufficient to understand that delay circuit 90 comprises a transistor 94 which is maintained in saturation conduction for relatively low received signal levels. For higher received signal levels (strong signals), transistor 94 responds to AGC voltage supplied via terminal T1 and comes out of saturation, thereby rendering a further transistor 96 conductive. The emitter of transistor 96 is coupled via a resistor 68 to the base electrode of transistor 38 and provides the second direct current source for transistor 38. The signal level at which transistor 96 conducts and makes the second direct current available is determined by the setting of an AGC delay control voltage source 92 external to chip 10'.

The purpose and mode of operation of the two direct current sources will now be described. In connection with FIG. 1, the operation of transistor 74, 76, 78 and associated components was described as providing impulse noise protection of the AGC circuit. That is, when the output of first video amplifier 20 includes relatively high-frequency noise components, transistors 74, 76 and 78 conduct to provide a relatively low impedance across the output of keying source 50 i.e., between terminal T6 and ground). Therefore, the amplitude or level of the keying voltage supplied by source 50 to the junction of resistors 36*c* and 36*b* is reduced. Conduction of transistor 38 is therefore reduced to an extent determined by the amplitude and frequency of recurrence of the detected noise pulses.

Under certain transient conditions which are encountered in normal operation of a television receiver, the above-described impulse noise protection circuit may operate to slow the response of the AGC system to such transients. For example, when changing channels in tuner 26, it is possible to switch from a relatively weak signal to a strong signal. In that case, the AGC system would operate, when tuned to the weak signal, to provide high gain of the combination of tuner 26 and I.F. amplifier 12. Upon switching to the strong signal channel, the video signal level initially will be sufficient to cause noise protection transistors 74, 76, 78 to conduct and thereby slow down the rate at which the AGC system responds i.e., conduction of transistor 38 will be reduced and therefore the gain of I.F. amplifier 12 and, if required, tuner 26 will be reduced only slowly). To offset this slowdown of AGC system operation, a relatively low-level direct current source comprising zener diode 64 and resistor 66 is provided. Resistor 66 is sufficiently large to limit the current to a small value. Thus, when a transient high-level video signal is supplied to transistor 34, transistor 34 switches off as the signal exceeds the threshold of transistor 34. The direct current supplied via resistor 66 and diode 64 flows into diode 58. Transistor 38 is of similar geometry with respect to diode 58 and, since resistors 36*a* and 36*b* are relatively small, a proportional current also flows in transistor 38 (e.g., twice the current in diode 58). The AGC voltage produced across capacitor 46 therefore is reduced (made less positive) so as to reduce the gain of I.F. amplifier 12 and/or tuner 26 sufficiently to restore the desired signal level at the output of video amplifier 20.

It may also be desirable to improve the response of the AGC system under the transient conditions which exist when the operation of keying source 50 is not in synchronism with the arrival of synchronizing signals at the output of video amplifier 20 (i.e., before the associated synchronizing system of the television receiver attains a desired "locked" condition).

In the "out-of-sync" condition, the keying pulses supplied by source 50 sometimes coincide with the occurrence of received sync pulses and sometimes do not coincide. The AGC system, under such conditions, will operate to provide proper signal gain when the two pulses coincide and will operate, generally, to increase signal gain when the pulses do not coincide. The video signal output of amplifier 20 therefore may be observed to include an amplitude modulation ("-beat") at the difference frequency between the received sync pulse frequency and the improper keying pulse frequency. One undesireable effect of such a beat is that the synchronizing pulses can be "stripped" from the video signal before application to the synchronizing circuits. An extended time interval may therefore be required before synchronization and proper AGC operation are obtained.

It is possible, in the described system, to reduce the effect of such out of synchronism beats by providing an additional direct current component to AGC transistor 38 in response to the occurrence of signal levels sufficient to drive transistor 34 to cut off. However, such a direct current component could also operate to detract from the operation of the impulse noise protection circuit described above. Recognizing, however, that impulse noise "setup" of the AGC system is not a problem when the received signals are relatively high level (i.e., strong signals), means are provided in the illustrated system for coupling an additional direct current to the transistor 38, under control of transistor 34, only during strong signal reception. The beat problem and consequent sync stripping are thereby substantially avoided.

Specifically, under strong signal reception conditions, the AGC system operates to place I.F. amplifier 12 in a relatively low gain (e.g., approximately unity gain) condition in response to a relatively low positive AGC voltage applied to terminal T1. Transistor 94 in AGC delay circuit 90 responds to such AGC voltage level, drops below saturation conduction and causes transistor 96 to conduct. Current is supplied via resistor 68 to the junction of resistor 36*b* and the base of transistor 38. When the negative-going video signal level at the base of transistor 34 is insufficient to cut off transistor 34, the current supplied via resistor 68 is shunted by the collector-emitter path of transistor 34 and transistor 38 remains substantially nonconducting. However, when the video signal at the base of transistor 34 is sufficiently low to cut that transistor off, current supplied via resistor 68 flows in the base-emitter of transistor 38 and also via resistors 36*a* and 36*b* to the diode 58. Since resistors 36*c* and 36*b* are in the latter path while the base of transistor 38 is directly connected to resistor 68, transistor 38 conducts to a greater extent (i.e., higher current) than diode 58 to achieve the desired relatively fast discharge of capacitor 4 and the consequent gain reduction of the tuner 26.

It should be noted that, under normal operating conditions, when transistor 38 supplied via diode 50 and resistor 54, the resistors 36*a* and 36*b* serve to scale the relative currents in diode 58 and transistor 38.

From the foregoing, it will be seen that an improved automatic gain control circuit suitable for fabrication on an integrated circuit chip has been provided.

What is claimed is:

1. In an automatic gain control circuit of the type including a source of recurrent voltage pulses normally in time coincidence with the recurrent synchronizing signal components of a video wave, the combination comprising:

an amplifying device;

means providing an input circuit and an output circuit connected with said device;

means for applying recurrent voltage pulses from said source of voltage pulses to said input circuit, said voltage pulses being an amplitude and polarity to alter the conductivity of said device;

switch means connected to said input circuit and responsive to the synchronizing signal components of said video wave for controlling the amplitude of said recurrent voltage pulses developed across said input circuit; and means coupled with the output circuit of said amplifying device for developing an automatic gain control voltage which varies as a function of the average conductivity of said amplifying device during time intervals in correspondence with the occurrence of said voltage pulses.

2. In an automatic gain control circuit arrangement of the type including a video signal having recurrent synchronizing signal components which may be accompanied by impulses noise, and a source of recurrent voltage pulses normally coincident with said synchronizing signal components, the combination comprising:

gain control means responsive to the synchronizing signal components of said video signal, to said recurrent voltage pulses and undesirable to said impulse noise for developing an automatic gain control voltage, means responsive to impulse noise accompanying said video signal coupled to said source of recurrent voltage pulses to control the amplitude of said recurrent voltage pulses applied to said gain control means.

3. An automatic gain control circuit comprising:

first and second transistors each having base, emitter and collector electrodes;

means connecting the collector-to-emitter path of said first transistor between the base and emitter electrodes of said second transistor;

means providing a source of video signals having recurrent synchronizing pulse components coupled between the base and emitter electrodes of said first transistor, said synchronizing pulse components extending in a first polarity direction;

means providing a source of recurrent keying pulses normally in time coincidence with said synchronizing pulse components coupled between the base and emitter electrodes of said second transistor, said keying pulses extending in a polarity direction opposite to that of said first polarity direction;

output circuit means for developing an automatic gain control voltage coupled between the collector and emitter electrodes of said second transistor.

4. An automatic gain control circuit as defined in claim 3 including means for biasing said first transistor to exhibit a low collector impedance in the absence of video signals, and wherein said synchronizing pulse components extend in a polarity direction to reduce the conduction in said first transistor, and wherein said second transistor is biased to cutoff in the absence of video signals and said keying pulses extend in a polarity direction to drive said second transistor into conduction.

5. An automatic gain control circuit as defined in claim 4 including a rectifier connected between the collector and emitter electrodes of said first transistor and poled to conduct current when the base-to-emitter path of said second transistor conducts current.

6. An automatic gain control circuit as defined in claim 5 including a first resistor connected between said source of keying pulses and the base electrode of said second transistor, and a second resistor connected between the base electrode of said second transistor and said rectifier.

7. A noise-protected automatic gain control circuit comprising:

first and second transistors each having base, emitter and collector electrodes;

means providing a source of video signals having recurrent synchronizing pulse components and which may undesirably be accompanied by impulse noise;

means providing a source of recurrent keying pulses normally in time coincidence with said synchronizing pulse components;

automatic gain control voltage developing means coupled to said source of video signals and to said source of keying pulses to develop an automatic gain control voltage as a function of said synchronizing pulses and undesirably as a function of said impulse noise;

differentiating circuit means coupling said source of video signals between the base and emitter electrodes of said first transistor;

capacitive means coupled between the emitter and collector electrodes of said first transistor;

means connecting the collector-to-emitter path of said second transistor across said source of keying pulses; and means connecting said capacitive means between the base and emitter electrodes of said second transistor.

8. An automatic gain control circuit as defined in claim 7 wherein said second transistor exhibits a relatively high collector impedance in the absence of noise impulses.

9. A noise-protected automatic gain control circuit comprising:

first, second and third transistors each having base, emitter and collector electrodes;

means connecting the collector-to-emitter path of said first transistor between the base and emitter of said second transistor;

means providing a source of video signals having recurrent synchronizing pulse components;

means including a source of biasing voltage for coupling said source of video signals between the base and emitter electrodes of said first transistor, said biasing voltage being poled to forward bias the base-emitter junction of said first transistor, said synchronizing signal components extending in a polarity direction to overcome said forward bias;

means connecting the collector-to-emitter path of said third transistor between the base and emitter electrodes of said second transistor, said third transistor normally exhibiting a high collector impedance;

peak detector means coupled to said video signal source and responsive to impulse noise which may undesirably accompany said video signals;

means for coupling said peak detector means between the base and emitter electrodes of said third transistor to forward bias the base-to-emitter junction of said third transistor in the presence of impulse noise;

means providing a source of recurrent keying pulses normally in time coincidence with said synchronizing pulse components connected between the base and emitter electrodes of said second transistor; and automatic gain control circuit means connected between the collector and emitter electrodes of said second transistor.

10. A noise-protected automatic gain control circuit as defined in claim 9 wherein said peak detector includes a fourth transistor having base, emitter and collector electrodes, a first capacitor and a resistor connected in series across said source of video signals, means connecting the base electrode of said fourth transistor to one terminal of said resistor, a second capacitor connected between the emitter electrode of said fourth transistor and the other terminal of said resistor, said first and second capacitors and said resistor having parameters to be responsive to a rate of change of voltage corresponding to that associated with impulse noise.

11. A noise-protected automatic gain control circuit as defined in claim 10 wherein said second transistor is biased to cut off in the absence of video signals and said keying pulses extend in a polarity direction to drive said second transistor into conduction.

12. A noise-protected automatic gain control circuit as defined in claim 11 including a rectifier connected between the collector and emitter electrodes of said first transistor and poled to conduct current when the base-to-emitter path of said second transistor conducts current.

13. A noise-protected automatic gain control circuit as defined in claim 12 including a second resistor connected between the base electrode of said second transistor and the collector electrode of said first transistor.

14. A noise-protected automatic gain control circuit as defined in claim 13 including a diode connected between said source of keying pulses and the base electrode of said second transistor and poled for current conduction in its reverse voltage breakdown mode.

15. In an automatic gain control circuit of the type including a source of recurrent voltage pulses normally in time coincidence with the recurrent synchronizing signal components of a video wave, the combination comprising:

an amplifying device;

means providing an input circuit and an output circuit connected with said device;

means for applying recurrent voltage pulses from said source of voltage pulses to said input circuit, said voltage pulses being of an amplitude and polarity to alter the conductivity of said device;

first switch means connected to said input circuit and responsive to the synchronizing signal components of said video wave for controlling the amplitude of said recurrent voltage pulses developed across said input circuit;

second switch means connected to said input circuit and responsive to impulse noise which may accompany the video wave for controlling the amplitude of said recurrent voltage pulses developed across said input circuit in a manner complementary to that of said first switch means; and means coupled with the output circuit of said amplifying device for developing an automatic gain control voltage which varies as a function of the average conductivity of said device during time intervals in correspondence with the occurrence of said voltage pulses.

16. An automatic gain control circuit as defined in claim 15 wherein said first switch means is open in response to synchronizing signal components exceeding a predetermined threshold, and said second switch means is closed in response to impulse noise components whose rate of change of voltage exceeds a predetermined threshold.

17. A noise-protected automatic gain control circuit comprising:

first and second transistors, each having base, emitter and collector electrodes;

means providing a source of video signals having recurrent synchronizing pulse components and which may undesirably be accompanied by impulse noise;

means providing a source of DC voltage;

automatic gain control voltage developing means coupled to said source of video signals and to said source of DC voltage to develop an automatic gain control voltage as a function of the amplitude of said synchronizing pulses and undesirably as a function of said impulse noise;

differentiating circuit means coupling said source of video signals between the base and emitter electrodes of said first transistor;

capacitive means coupled between the emitter and collector electrodes of said first transistor;

means connecting the collector to emitter path of said second transistor across said source of DC voltage; and means connecting said capacitive means between the base and emitter electrodes of said second transistor.

18. An automatic gain control circuit as defined in claim 17 wherein said second transistor exhibits a relatively high collector impedance in the absence of noise impulses.

19. An automatic gain control circuit as defined in claim 17 wherein said automatic gain control voltage developing means includes:

third and fourth transistors, each having base, emitter and collector electrodes, said source of video signals being coupled to the base and emitter electrodes of said third transistor and said source of DC voltage being coupled to the base and emitter electrodes of said fourth transistor such that the synchronizing pulse components extend in a polarity direction opposite to the polarity of said coupled DC source voltage; and output circuit means for developing an automatic gain control voltage coupled between the collector and emitter electrodes of said fourth transistor.

20. In an automatic gain control circuit of the type including a source of recurring pulses normally in time coincidence with the recurrent synchronizing signal components of video wave, the combination comprising:

a semiconductor amplifying device having an input circuit and an output circuit;

means coupled to said output circuit for developing an automatic gain control voltage which varies, at least in part, as a function of average conduction of said device;

semiconductor switching means coupled to said input circuit and responsive to the level of said video wave for providing a low-impedance current path from said source for video signal levels of one sense with respect to a reference level and for providing a high-impedance current path for video signal levels of opposite sense with respect to said level;

means coupled across said first switching means and responsive to switching thereof from low impedance to high impedance for coupling said pulse source to said amplifying device input circuit; and direct current supply means coupled to said last-named means, to said switching means and to said input circuit for supplying auxiliary current to said amplifying device upon switching of said switching means.

21. The combination according to claim 20 wherein said direct current supply means comprises a first source of relatively low direct current for supplying current to said input circuit of said amplifying device upon switching of said switching means.

22. The combination according to claim 20 wherein said direct current supply means comprises a second source of direct current and means responsive to reception of signals above a predetermined threshold for coupling said first current source to said input circuit upon switching of said switching means.

23. The combination according to claim 21 wherein said direct current supply means further comprises a second source of relatively high direct current and means responsive to the presence of signals above a predetermined threshold for coupling said second source of direct current to said input circuit upon switching of said switching means.

24. The combination according to claim 23 wherein said switching means comprises a transistor having an input circuit and an output circuit, said input circuit being coupled to a source of video waves, and said output circuit being normally conductive for video signals above a threshold level and nonconductive for video signals below said level.

2. In an automatic gain control circuit of the type including a source of recurring pulses normally in time coincidence with the recurrent synchronizing signal component of a video wave, the combination comprising:

a transistor amplifier having an input base-emitter circuit and an output collector-emitter circuit;

a means coupled to said output circuit for developing an automatic gain control voltage which varies, at least in part, as a function of average conduction of said amplifier;

a transistor switching device having a collector-emitter path coupled to said input circuit and a base-emitter path coupled to a source of video waves, biasing means coupled to said switching device base-emitter path for maintaining said collector-emitter path conductive for video signals above a threshold level and for permitting said collector-emitter path to switch to high impedance for video signals below said level;

a diode coupled across said collector-emitter path and poled for conduction in the same direction as said last-named path responsive to switching of said switching device for coupling said pulse source to said amplifier input circuit; and direct current supply means coupled to said collector emitter path and to said diode for supplying auxiliary current to said amplifier upon switching of said switching device.

26. The combination according to claim 2 wherein said direct current supply means comprises a first source of relatively low direct current coupled to said collector-emitter path, a second source of higher direct current and means responsive to reception of signals above a predetermined threshold for coupling said second source to said collector-emitter path.

* * * * *

UNITED STATES PATENT OFFICE
CERTIFICATE OF CORRECTION

Patent No. 3,634,620 Dated January 11, 1972

Inventor(s) Jack Rudolph Harford

It is certified that error appears in the above-identified patent and that said Letters Patent are hereby corrected as shown below:

Column 8, line 11, "4" should read -- 46 --; Column 8, line 31, "being an amplitude" should read -- being of an amplitude --. Column 12, lines 11 and 12, "first" should be -- direct --; Column 12, line 26, "2" should read -- 25 --; Column 12, line 52, "2" should read -- 25 --.

Signed and sealed this 17th day of October 1972.

(SEAL)
Attest:

EDWARD M.FLETCHER,JR.
Attesting Officer

ROBERT GOTTSCHALK
Commissioner of Patents